Figure 1:
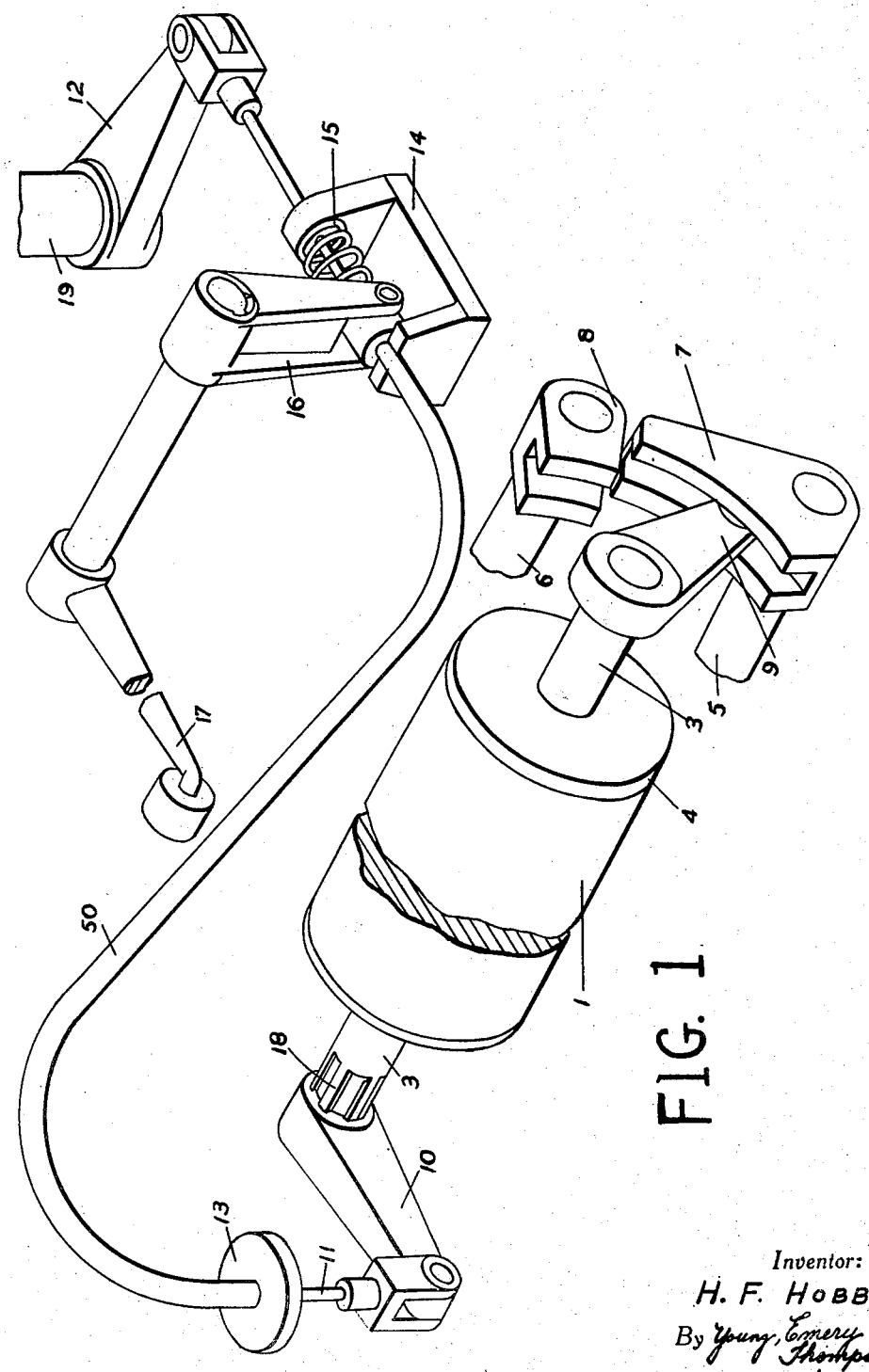

Oct. 31, 1950 H. F. HOBBS 2,527,727
POWER TRANSMISSION APPARATUS
Filed June 16, 1947 3 Sheets-Sheet 1

Inventor:
H. F. HOBBS
By Young, Emery &
Thompson
Attorneys

Oct. 31, 1950          H. F. HOBBS          2,527,727
POWER TRANSMISSION APPARATUS

Filed June 16, 1947                                             3 Sheets-Sheet 2

INVENTOR.
HOWARD FREDERICK HOBBS.
BY *Young, Emmy & Thompson*
ATTORNEYS.

Oct. 31, 1950          H. F. HOBBS          2,527,727

POWER TRANSMISSION APPARATUS

Filed June 16, 1947          3 Sheets-Sheet 3

INVENTOR.
HOWARD FREDERICK HOBBS.
BY *Young, Emery & Thompson*
ATTORNEYS

Patented Oct. 31, 1950

2,527,727

UNITED STATES PATENT OFFICE 2,527,727

POWER TRANSMISSION APPARATUS

Howard Frederick Hobbs, Leamington Spa, England, assignor to Hobbs Transmission Limited, Leamington Spa, England, a British company Application June 16, 1947, Serial No. 754,997
In Great Britain July 3, 1946

6 Claims. (Cl. 74—346)

This invention relates to control apparatus for effecting change of ratio in a variable-ratio power transmission apparatus of the kind comprising one or more hydraulically actuated friction clutches and/or brakes and a gearing in which latter gear change is effected by sliding one or more toothed elements along the appropriate shaft or shafts into and out of mesh with the other toothed elements.

According to the present invention the control apparatus has fluid pressure supply ports and exhaust ports suitable for connection to the clutches and/or brakes and comprises piston and cylinder elements one of which is adjustable rotatably about its axis into two or more angular positions whereby ports in both elements can be moved into such relative positions as to apply fluid pressure to one or the other end of the piston so as to effect movement of one of the elements in an axial direction and thereby control of the relative positions of ports in said elements, movable means being provided for utilising these axial movements for effecting actuation of slidably engageable toothed elements in said mechanism. Only one of said elements (preferably the piston) may be movable as a common member to effect both valve control and actuation of said toothed elements.

Resilient means may be interposed between the adjustable element and the said movable means in order that the latter can operate quickly to effect a "snap" engagement of the toothed elements which may be provided in known manner with balking means so that engagement is effected only after the speeds of the elements to be engaged are synchronised.

The said common member may be associated with the toothed elements through selector mechanism whereby the angular adjustments effect positioning of the ports and at the same time cause engagement of the required parts of the selector mechanism.

The invention may be applied to gearing such as described in the specification of British Patent applications Nos. 21,885/44, 26,104/44 and 11,847/46.

A constructional form of the invention will now be described by way of example with reference to the accompanying diagrammatic drawings wherein:

Figure 1 is an isometric drawing showing the general arrangement of an apparatus made in accordance with the invention; and Figures 2 to 7 are vertical longitudinal sections of the control cylinder of the apparatus showing the piston and associated parts in various positions.

A cylinder 1 which is conveniently mounted on a gear box cover plate or in a gear box housing supports in its end covers 4 a control rod 3 on which is mounted a striker arm 9 which engages in one or the other of two grooved blocks 7, 8, attached respectively to two selector rods 5, 6. The rods 5, 6, are mounted in the gear box cover or housing in the usual way and carry striker forks engaging toothed elements which can be engaged or disengaged by endwise movement of the rods. The rods 5, 6, may be interlocked and arranged in the manner commonly employed in gear boxes having selector rods. In the example shown the rod 6 will cause engagement of a reversing train of gears when moved in one direction or the disengagement of the train when moved in the other direction, and the rod 5 may be moved in one direction to engage one train of gears and in the other to engage another train of gears, both trains being disengaged when the rod is in the central position.

The rod 3 is mounted so as to be moveable axially whereby the striker arm 9 will move the block 7 and rod 5 or the block 8 and rod 6. Rotation of the rod 3 can cause the striker arm 9 to engage one or the other of blocks 7 or 8, block 7 being a forward drive selector block and 8 being a reverse drive selector block. The axial movement of the rod 3 is caused by hydraulic pressure as will be explained later.

The front end of the rod 3 carries a spline 18 on which is mounted a lever 10. A flexible cable 11 connects the lever 10 to an arm 12 mounted on a rod 19 the outer end of which (not shown) carries a gear change lever arranged beneath the steering wheel of a motor vehicle. Movement of the gear lever will cause rotation of the rod 19 about its axis and hence rotation of the control rod 3 about its axis. One end of the casing 50 of the cable is rigidly connected to the abutment 13, the other end is held at one end of the abutment bracket 14 by the spring 15. The arm 16 is connected to the end of the casing 50. The accelerator or throttle pedal of the vehicle connects the arm 16 by means of an arm 17 and a key which provides lost motion so that should the pedal be moved beyond the position giving fully opened throttle the arm 16 will cause the end of the cable to be moved away from the adjacent end of the abutment 14 and the spring 15 to be compressed. This produces a lengthening of the operative length of the cable whereby the lever 10 is moved. Movement of the casing relative to the fixed cable produces a similar result to movement of the cable relative to the fixed casing. The lever 10 is thus moved both by the gear change lever and by the accelerator pedal.

The control rod 3 can be moved into eight different angular positions which may correspond to:

Position (1). Reverse.
        Position (2). Neutral.
        Position (3). Neutral.
        Position (4). First.
        Position (5). Second.
        Position (6). Third.
        Position (7). Top.
        Position (8). Over-drive.

In positions 1 and 2 the striker arm 9 will engage the block 8. In positions 3 to 8 the striker rod will engage the block 7.

The purpose of the connection to the accelerator pedal 17 described above is as follows:

Should the gear lever for example be selected so as to set the control rod 3 in position 8 and the pedal 17 is moved fully downwards the rod 3 will be moved to position 7. Thus to obtain additional acceleration the operator may move the pedal 17 beyond the full throttle position thereby making a change in ratio without shifting the position of the gear lever. If the pedal is allowed to move upwards the spring 15 will cause the rod 3 to return to the position selected by the gear lever. The splines 18 permit the rod 3 to move axially independently of the lever 10 which is suitably mounted against endwise movement.

Fluid pressure from a pump not shown can enter the cylinder through ports, 20, 21. Fluid may be exhausted from the cylinder through ports 22, 23. Ports such as 24, 25 are provided whereby pressure can be led to hydraulically actuated clutches and/or brakes employed in the gear to which the apparatus is fitted.

A piston 2 fits slidably within the cylinder and engages the control rod 3 by means of a splined hub 43 and splines 46 formed in the piston.

Rotation of the rod 3 into its various angular positions will therefore also rotate the piston 2 into similar positions. The piston 2 carries drillings, ports and channels such as 26, 27, 28. These are arranged so that when in the angular positions the various channels and ports can communicate with the ports 20 or 21, 24 or 25, 22 or 23, as will be explained in more detail below. It will be seen therefore that movement of the gear lever will cause rotation of the rod 3 and of the piston 2 and thus bring into communication the desired channels, ports or oil ways. The piston 2 can move endwise i. e., axially in the cylinder and may impart this endwise movement to the rod 3 through springs 47, 48. The springs 47, 48, are compressed between washers 44, 45, and the ends of the piston. The splines 46 have reduced diameter over a portion of the length so as to form seatings for the washers 44, 45. Displacement of the hub 43 relative to the piston 2 will lift one of the washers 44, 45 from its seating and cause additional compression of one of the springs. It will be understood that the grooves, one of which is shown at 26, or the drillings, one of which is shown 30, can be brought into communication with the pressure inlet 21 thereby opening the pressure to the space 41. In designing the apparatus to suit various gearboxes, if it is desired to move the piston and rod 3 to the left in a given angular position a groove such as 26, or a drilling such as 30, will be provided in that position. If it is desired to move the piston and rod to the right then a similar groove or drilling will engage the pressure inlet 20 and thus open the pressure to the space 42. If it is desired to bring the piston and rod to the central position drillings such as 49, 50 will be brought into line with the inlet ports 20, 21. If the piston is to the left the space 42 will be opened to pressure by a drilling 50 and port 20. If the piston is to the right the space 41 will be opened to pressure by a drilling 49 and inlet 21. As the piston approaches the central position both ends of the piston may be opened to pressure. Similarly the exhaust ports 22, 23, will be opened as required, hence if pressure is applied to the space 42 so as to move the piston to the right then the space 41 will be opened to the exhaust 24 by drilling 51. The drillings such as 27, 28, are arranged also to engage the ports 24, 25, leading to the hydraulically actuated clutches. In the position shown for example in Figure 2 the pressure enters the space 41 by way of 21, 26, and holds the piston to the left. The pressure passes through drilling 28, to the port 24, and so engages the selected clutch. The space 42 is opened to the exhaust 22 and the clutch connected to 25 is also opened to the exhaust 22. It will be observed that the piston may be moved to an angular position in which the drilling 29 is brought into alignment with the port 24. When the piston is first brought to this angular position it may be to the right and therefore whilst the drilling 28 is brought into alignment with the port 24 the pressure is not opened to the port 24 until the piston has been moved to the left by the pressure in the space 41. As described the rod 3 is connected with toothed elements in the gear box, and these are provided with balking devices whereby the toothed elements cannot engage until the speeds are synchronized. The rod 3 may therefore be urged in the required direction but may resist movement whilst speeds are being synchronized, or alternatively whilst load is being removed from toothed elements to be disengaged. In these circumstances the piston can move relatively to the rod 3 by additional compression of one of the springs 47, 48 which maintain the desired urging load on the rod.

When speeds become synchronized or when sufficient load is removed from the engaged toothed elements the rod is moved rapidly in the required direction owing to the compression of the spring, hence the movement of the piston which may be relatively slow may take place prior to the movement of the rod which will be relatively fast as required for engaging and disengaging toothed elements, particularly when this operation is accomplished with the engine of the vehicle operated under power.

The operation of the device is as follows:

It will be assumed that the control apparatus is fitted to a gearing as described in our prior British patent application No. 11,847 of 1946. This gearing provides reverse, neutral and six forward speeds, but it is intended to normally use only five, e. g., 1st, 3rd, 4th, 5th, 6th.

Figure 5:
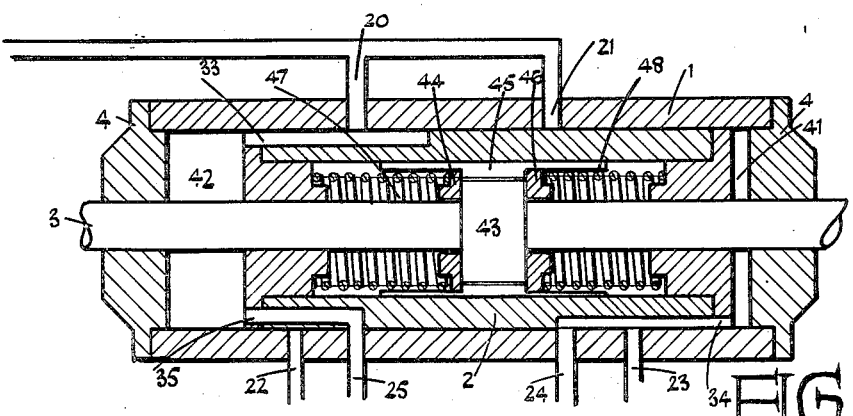

For reverse running the control will be moved to its first angular position and the oil ways cut in this position are as shown in Figure 5. The oil pressure from the pump will enter the space 42 through port 20 and groove 33. The groove 34 will open the space 41 to exhaust, and the piston will move to the right thereby moving rod 3 to the right. The striker arm 9 will engage the block 8 and the selector rod 6 will therefore also move to the right engaging the reverse idler pinion. After the piston has completed or nearly completed its travel the space 42 will open to the port 25 and will engage the appropriate clutch for operation in reverse. Should the teeth of the pinion to be engaged be aligned with those of the mating gears movement of the control rod 3 will be resisted and the spring 47 will be further compressed until the port 25 is opened. As the clutch connected to this port commences engagement the teeth will be moved into alignment and the rod 3 will "snap" to the right.

If the control lever and the rod 3 are now rotated to the next position which provides neutral the striker arm will move in the groove in the block 8. Further rotation of the rod 3 is prevented until such time as the groove in the block 8 is aligned with the groove in the block 7. Rotation to the second position will bring other oil ways in the piston into alignment with the ports. These oil ways are somewhat similar to those shown in Figure 4 and are indicated by the dotted lines on Figure 4. On first rotating the piston to the second position the piston will be in its right hand endwise position. Oil pressure from inlet port 21 will then enter the space 41 via the drilling 30. The space 42 will be opened to the exhaust 22 through drilling 32. The piston therefore will move towards the left. On reaching the central position the port 21 automatically closes and further movement would open the port 20. The piston therefore remains set in its central position when both inlet ports 20, 21, are shut and both exhausts 22, 23, are very slightly opened. Both ports 24, 25 are closed and therefore both clutches disengaged. The rod 3 can now be rotated to its third position as the grooves in the blocks 7, 8, are in line.

In its third angular position the piston will be provided with oil ways similar to those for its second angular position. The reason for this is that should the control be selected for a forward speed it can be moved to position 3 which will place the gear in neutral and bring the block 7 into alignment with the block 8 whereby the striker arm 9 can be moved over to the second and first positions.

If the piston is now rotated to its fourth angular position oil ways such as shown in Figure 5 will be brought into effective use. The action is similar to that described for reverse the only difference being that the striker arm 9 now engages the block 7 and therefore moves the rod 5 to the right and engages the train of gears required for first gear operation. The same clutch, i. e., that connected to port 25 is employed for both reverse and first gear.

Figure 6:
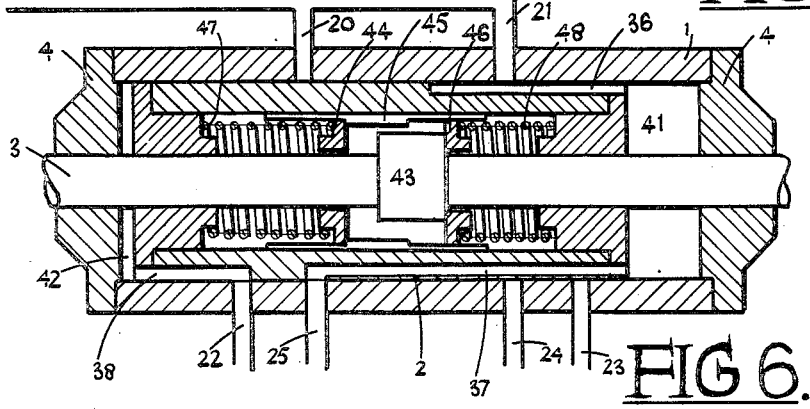

To obtain second gear the piston is moved to its fifth angular position, the change from first to second will be described later with reference to Figure 7, but when second gear is engaged the piston will be in the position shown in Figure 2 and the oil ways will be as shown in Figure 6. The oil pressure will enter the port 21, groove 36 and the space 41 and will pass through the drilling 37 to the port 25 thus engaging the same clutch as employed for first and reverse gears. As shown in Figure 6 the rod 3, selector rod 5 and the toothed elements to be engaged are balked and the piston is moved against the spring 48. When the speeds of the toothed elements become equal and the balking device dislodged the rod 3 and other parts will "snap" to the left, and the rod will take up the position shown in Figure 2.

Figure 2:
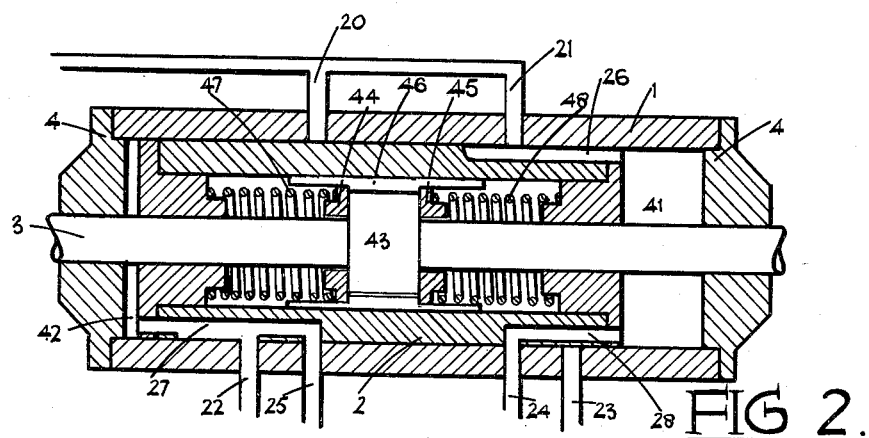

To obtain third gear the piston is moved to its sixth angular position and the oil ways then are as shown in Figure 2. Pressure enters the space 41 through port 21 and groove 26 and is led to the clutch connecting port 24 through drilling 28. The pressure in the space 41 holds the piston to the left.

Figure 4:
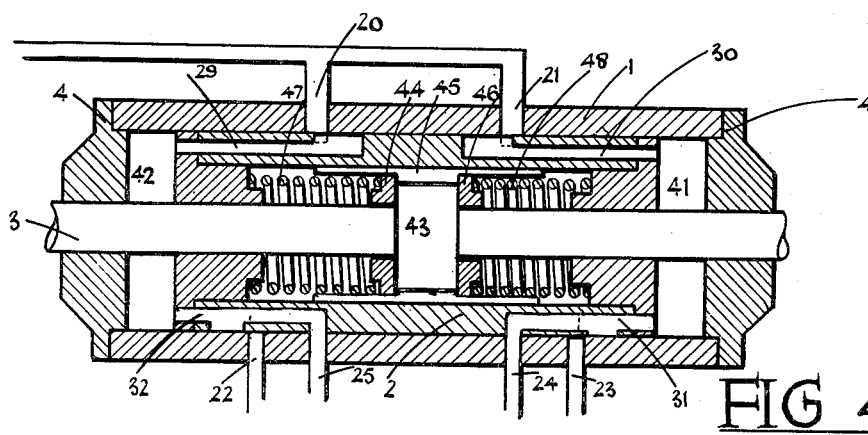

For fourth gear, or top, the piston is rotated to its seventh position and the oil ways are as shown in Figure 4. Pressure enters the space 42 from the port 20 through the drilling 29. The space 41 is exhausted through drilling 31 and exhaust port 23, and the piston will move towards the right. On reaching the central position as shown in Figure 4 pressure enters both spaces 41, 42, and both clutch ports 24, 25. The unit operates in top gear with both clutches engaged and both gear trains disengaged.

Figure 3:
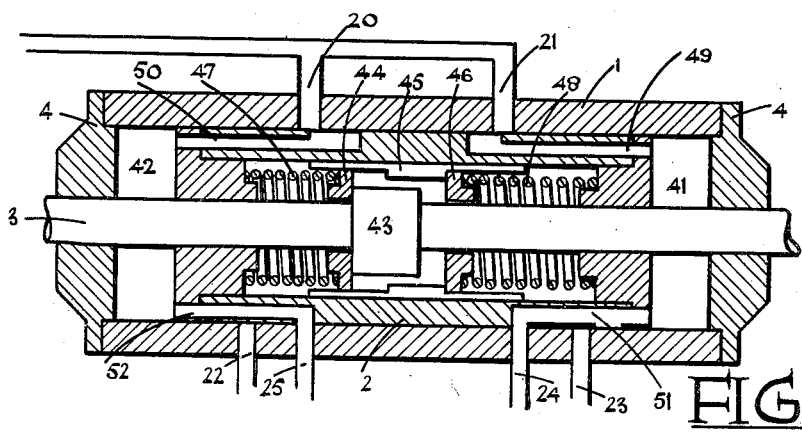

Figure 3 shows the apparatus with the rod 3 in its left hand position and with the piston in its central position. Spring 47 having been compressed and both clutches engaged owing to pressure reaching both ports 24, 25. As the clutches become engaged the driving load on the toothed elements in the gear box will be automatically removed and the rod 3 will "snap" to its central position as shown in Figure 4.

To obtain the fifth gear, or over-drive, the piston is rotated to its eighth position and the oil ways are similar to those shown in Figure 4 except that the space 41 is connected to the clutch port 24 and the space 42 is connected to a further clutch port not shown which leads to the reaction clutch or brake in the gear. It will be understood that grooves can be provided in the piston whereby the clutches not in use in any position can be opened to an exhaust port. It will be observed that with the piston in any position for forward running it can be moved to any other positions 3 to 8 and the oil ways provided will be such as to cause the piston to take up a suitable endwise position whereby the toothed elements are suitably positioned and the desired clutch, or clutches, engaged. When operating in any of the positions 3 to 8 positions 2 or 1 cannot be obtained until position 3 is first selected and the rod 3 brought to its central position.

Figure 7:
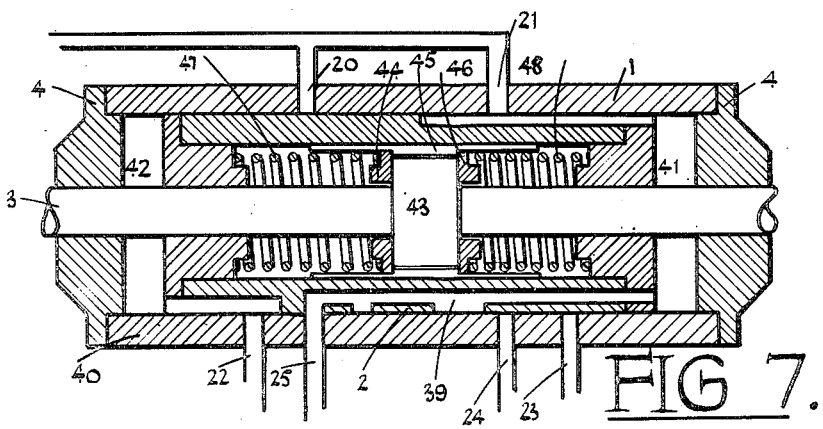

For making the change between first and second gear the oil ways may be as shown in Figure 7, i. e., when the piston is in its fifth angular position. The change commences with the piston to the right and oil pressure enters the space 41 from the inlet port 21. This moves the piston to the left. During the first part of the travel the port 24 is opened to the space 41 by means of the drilling 39. In the specification of our prior patent application referred to above two emergency low ratios are described, and the gear provides six forward ratios in all. It is intended for normal purposes the 1st, 3rd, 4th, 5th and 6th ratios only be employed and the gear be designed so that the 2nd ratio is somewhat less than the 3rd ratio, i. e., provides a higher "gear." This 2nd ratio is brought into operation by opening the port 24 to pressure, hence during the first portion of the travel of the piston a change is made from 1st to 2nd ratio. On the piston approaching its central position the port 24 is closed and the port 25 is opened. This momentarily removes the driving load from the toothed elements and the spring 48, which has been further compressed during the piston travel, "snaps" the rod 3 to its central position. Further movement of the piston closes the port 25 and still further movement reopens it. The effect of this action is first to change to a slightly higher gear than will be given when the change is completed. The momentary opening of the port 25 serves to engage the clutch and cause the speeds of the parts of the gear box to be reduced. The final movement of the piston to the left again compresses the spring 48, the rod 3 being prevented from movement by the balking device. As the driving ratio engaged during the change produces a somewhat higher gear the engine speed must now increase to dislodge the balking device when the rod 3 "snaps" to the left. This results in a "down" change being effected within the gear box to produce an "up" change. In other words, over-synchronization takes place and re-synchronization is then effected. Two advantages are obtained from this type of change. (1) "Down" is more easily accomplished than "up" change owing to synchronizing for "down" change being dependent on the change in speed of the engine and flywheel instead of on the speed of engagement of the clutches as for "up" change, and (2) the balking device associated with the toothed elements need only be constructed to operate in the one direction, hence 2nd and 3rd ratios can be readily selected when the vehicle is stationary, whereas if the balking device is operative in both directions it would prevent these ratios being selected. First gear would always have to be selected for making an initial start. With a gear box and control as described the first gear need only be used occasionally and can be provided for emergency conditions only.

The control apparatus described can be applied to any type of transmission apparatus which includes hydraulically actuated clutches or brakes and toothed elements to be engaged and disengaged. The oil ways can be suitably constructed for example to be applied to apparatus described in our prior British patent 619,234, accepted March 7, 1949. The oil ways in the piston may be arranged so that pressure is directed to appropriate clutches or brakes to effect synchronization of the speeds of toothed elements when the piston is in an intermediate position so that the operator may make a slight pause in moving the piston from one angular position to the next so as to produce the required synchronization action.

The force from the piston may be utilised to effect synchronizing of speeds by means of well known types of synchronizers as used in gear boxes known as synchro-mesh. The area of the oil ways may be suitably proportioned to produce any delay required for the synchronizing action.

I claim:

1. A control apparatus for effecting change of ratio in a power transmission mechanism of the kind comprising hydraulically actuated friction clutches and a gearing in which gear change is effected by sliding toothed elements along appropriate shafts into and out of mesh with other toothed elements, said control apparatus comprising a cylinder having ports therein, a piston having ports therein, means for adjusting the piston rotatably about its axis in a plurality of positions whereby the ports in the piston are moved into a plurality of positions relative to the ports in the cylinder, several of the ports serving as supply ports and communicating with the ends of the piston, several other ports communicating with the ends of the piston and with the hydraulically actuated friction clutches in the mechanism, and the remaining ports communicating with the ends of the piston and serving as exhaust means, means for supplying fluid pressure to the supply ports for moving the piston axially within the cylinder, and means actuated by axial piston movements for sliding the toothed elements in the mechanism into engagement, the rotation of the piston in the plurality of positions and the association of the ports in the piston with the ports in the cylinder in each of the said positions determining the selection of gear ratio in the power transmission mechanism.

2. A control apparatus for effecting change of ratio in a power transmission mechanism of the kind comprising hydraulically actuated friction clutches and a gearing in which gear change is effected by sliding toothed elements along appropriate shafts into and out of mesh with other toothed elements, and balking means for synchronizing the meshing of the said toothed elements, said control apparatus comprising a cylinder having ports therein, a hollow piston having drillings and channels therein communicating with the ends of the piston, several of said ports serving as supply ports and registering with several of the said drillings and channels, several other ports communicating with the drillings and channels and the hydraulic friction clutches in the power transmission mechanism, the remaining ports communicating with several of the drillings and channels and serving as exhaust means, means for supplying fluid pressure to the supply ports for moving the piston axially within the cylinder, a rod having an abutment thereon and coaxially disposed with the piston, said rod and piston being relatively movable axially and fixed against relative rotation, spring means between the ends of the piston and the said abutment for urging the rod in the same direction as the piston, means for rotating the rod and engageable with one end thereof, and a striker arm attached to the opposite end of the rod, selector mechanisms engageable by said striker arm for sliding the toothed elements in the power transmission mechanism into and out of mesh with the other toothed elements in response to the axial movement of the piston, the rotation of the piston in a plurality of positions and the registry of the ports in the cylinder with the drillings and channels in the piston determining the selection of the gear ratio in the power transmission mechanism.

3. A control apparatus for effecting change of ratio in a power transmission mechanism of the kind comprising hydraulically actuated friction clutches and a gearing in which gear change is effected by sliding toothed elements along appropriate shafts into and out of mesh with other toothed elements, and balking means for synchronizing the meshing of the said toothed elements, said control apparatus comprising a cylinder having ports therein, a hollow piston having drillings and channels therein communicating with the ends of the piston, several of said ports serving as supply ports and registering with several of the said drillings and channels, several other ports communicating with the drillings and channels and the hydraulic friction clutches in the power transmission mechanism, the remaining ports communicating with several of the drillings and channels and serving as exhaust means, means for supplying fluid pressure to the supply ports for moving the piston axially within the cylinder, a rod having an abutment thereon and coaxially disposed with the piston, said rod and piston being relatively movable axially and fixed against relative rotation, spring means between the ends of the piston and the said abutment for urging the rod in the same direction as the piston, means for rotating the rod and engageable with one end thereof, and a striker arm attached to the opposite end of the rod, selector mechanisms engageable by said striker arm for sliding the toothed elements in the power transmission mechanism into and out of mesh with the other toothed elements in response to the axial movement of the piston, said spring means connecting the piston and rod for lost motion and enabling the piston to be moved while the selector mechanism engaged by the striker arm is restrained by the balking means and effecting relatively quick movement of the selector mechanism upon proper meshing of the toothed elements in the power transmission mechanism, the rotation of the piston in a plurality of positions and the registry of the ports in the cylinder with the drillings and channels in the piston determining the selection of the gear ratio in the power transmission mechanism.

4. A control apparatus for effecting change of ratio in a power transmission mechanism of the kind comprising hydraulically actuated friction clutches and a gearing in which gear change is effected by sliding toothed elements along appropriate shafts into and out of mesh with other toothed elements, and balking means for synchronizing the meshing of the said toothed elements, said control apparatus comprising a cylinder having ports therein, a hollow piston having drillings and channels therein communicating with the ends of the piston, several of said ports serving as supply ports and registering with several of the said drillings and channels, several other ports communicating with the drillings and channels and the hydraulic friction clutches in the power transmission mechanism, the remaining ports communicating with several of the drillings and channels and serving as exhaust means, means for supplying fluid pressure to the supply ports for moving the piston axially within the cylinder, a rod having an abutment thereon and co-axially disposed with the piston, said rod and piston being relatively movable axially and fixed against relative rotation, spring means between the ends of the piston and the said abutment for urging the rod in the same direction as the piston, means for rotating the rod and engageable with one end thereof, a striker arm attached to the opposite end of the rod, a forward drive selector mechanism and a reverse drive mechanism, engageable by said striker arm for sliding the toothed elements in the power transmission mechanism into and out of mesh with the other toothed elements in response to the axial movement of the piston, the rotation of the piston in a plurality of positions and the registry of the ports in the cylinder with the drillings and channels in the piston determining the selection of the gear ratio in the power transmission mechanism, the piston, while in any axial position, being movable to a different angular position wherein the ports in the cylinder and the drillings and channels in the piston are brought into the correct angular position for the change of gear ratio determined by the new angular position of the piston, and the piston then moves to its correct axial position.

5. A control apparatus for effecting change of ratio in a power transmission mechanism of the kind comprising hydraulically actuated friction clutches and a gearing in which gear change is effected by sliding toothed elements along appropriate shafts into and out of mesh with other toothed elements, and balking means for synchronizing the meshing of the said toothed elements, said control apparatus comprising a cylinder having ports therein, a hollow piston having drillings and channels therein communicating with the ends of the piston, several of said ports serving as supply ports and registering with several of the said drillings and channels, several other ports communicating with the drillings and channels and the hydraulic friction clutches in the power transmission mechanism, the remaining ports communicating with several of the drillings and channels and serving as exhaust means, means for supplying fluid pressure to the supply ports for moving the piston axially within the cylinder, a rod having an abutment thereon and co-axially disposed with the piston, said rod and piston being relatively movable axially and fixed against relative rotation, spring means between the ends of the piston and the said abutment for urging the rod in the same direction as the piston, means for rotating the rod and engageable with one end thereof, a striker arm attached to the opposite end of the rod, a forward drive selector mechanism and a reverse drive mechanism, engageable by said striker arm for sliding the toothed elements in the power transmission mechanism into and out of mesh with the other toothed elements in response to the axial movement of the piston, the rotation of the piston in a plurality of positions and the registry of the ports in the cylinder with the drillings and channels in the piston determining the selection of the gear ratio in the power transmission mechanism, the piston, while in any axial position, being movable to a different angular position wherein the ports in the cylinder and the drillings and channels in the piston are brought into the correct angular position for the change of gear ratio determined by the new angular position of the piston, and the piston then moves to its correct axial position, said piston completing part of its axial movement before the ports in the cylinder communicating with the clutches are in proper registry with the drillings and channels in the piston.

6. A control apparatus for effecting change of ratio in a power transmission mechanism of the kind comprising hydraulically actuated friction clutches and a gearing in which gear change is effected by sliding toothed elements along appropriate shafts into and out of mesh with other toothed elements, and balking means for synchronizing the meshing of the said toothed elements, said control apparatus comprising a cylinder having ports therein, a hollow piston having drillings and channels therein communicating with the ends of the piston, several of said ports serving as supply ports and registering with several of the said drillings and channels, several other ports communicating with the drillings and channels and the hydraulic friction clutches in the power transmission mechanism, the remaining ports communicating with several of the drillings and channels and serving as exhaust means, means for supplying fluid pressure to the supply ports for moving the piston axially within the cylinder, a rod having an abutment thereon and co-axially disposed with the piston, said rod and piston being relatively movable axially and fixed against relative rotation, spring means between the ends of the piston and the said abutment for urging the rod in the same direction as the piston, a flexible cable connected to one end of the rod for rotating the same, a ratio change member connected to the opposite end of the cable, a flexible member encasing part of the cable, said casing secured at one end to an abutment and at the other end being operatively connected to an accelerator pedal, movement of one end of the casing causing a change in the operative length of the cable resulting in an angular adjustment of the piston, and a striker arm attached to the opposite end of the rod, selector mechanisms engageable by said striker arm for sliding the toothed elements in the power transmission mechanism into and out of mesh with the other toothed elements in response to the axial movement of the piston, the rotation of the piston in a plurality of positions and the registry of the ports in the cylinder with the drillings and channels in the piston determining the selection of the gear ratio in the power transmission mechanism.

HOWARD FREDERICK HOBBS.

REFERENCES CITED

The following references are of record in the file of this patent:

UNITED STATES PATENTS

| Number | Name | Date |
| --- | --- | --- |
| 1,673,487 | Bice | June 12, 1928 |
| 2,176,916 | Maybach | Oct. 24, 1939 |
| 2,261,051 | Cassell | Oct. 28, 1941 |
| 2,278,351 | Havens et al. | Mar. 31, 1942 |